(12) United States Patent
Sui et al.

(10) Patent No.: US 11,997,031 B2
(45) Date of Patent: *May 28, 2024

(54) SPECIAL SUBFRAME UTILIZATION FOR NB-IOT TRANSMISSION IN TDD MODE

(71) Applicant: Telefonaktiebolaget LM Ericsson (publ), Stockholm (SE)

(72) Inventors: Yutao Sui, Solna (SE); Johan Bergman, Stockholm (SE); Xingqin Lin, Santa Clara, CA (US); Gerardo Agni Medina Acosta, Märsta (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,543

(22) Filed: Feb. 22, 2022

(65) Prior Publication Data

US 2022/0182195 A1    Jun. 9, 2022

Related U.S. Application Data

(63) Continuation of application No. 16/342,116, filed as application No. PCT/EP2018/071278 on Aug. 6, 2018, now Pat. No. 11,271,692.

(Continued)

(51) Int. Cl.
*H04L 5/00* (2006.01)
*H04L 1/08* (2006.01)
*H04L 5/14* (2006.01)

(52) U.S. Cl.
CPC .............. *H04L 5/0044* (2013.01); *H04L 1/08* (2013.01); *H04L 5/14* (2013.01)

(58) Field of Classification Search
CPC ............ H04L 5/0044; H04L 1/08; H04L 5/14
See application file for complete search history.

(56) References Cited

U.S. PATENT DOCUMENTS

| 9,167,580 | B2 | 10/2015 | Nam et al. |
| 2014/0092921 | A1 | 4/2014 | Seo et al. |

(Continued)

FOREIGN PATENT DOCUMENTS

| CN | 103503335 A | 1/2014 |
| CN | 107005882 A | 8/2017 |

(Continued)

OTHER PUBLICATIONS

Ericsson, et al., New WID on Even further enhanced MTC for LTD, 3GPP TSG RAN Meeting #75, Dubrovnik, Croatia, Mar. 6-9, 2017, RP-170732 (revision of RP-170465).

(Continued)

*Primary Examiner* — Eric Myers
(74) *Attorney, Agent, or Firm* — COATS & BENNETT, PLLC

(57) ABSTRACT

A base station and wireless device are configured to support TDD operation. In exemplary embodiments, the base station or UE can make use of the available symbols in the DwPTS or UpPTS of a special subframe respectively for NB-IoT transmissions. In one example, the base station can use OFDM symbols in the DwPTS to repeat in a predetermined manner some of the symbols transmitted in an immediately preceding downlink subframe, or in a succeeding downlink subframe. In other embodiments, the UE can use symbols in the UpPTS to repeat in a predetermined manner some of the symbols transmitted in the immediately succeeding uplink subframe, or in a preceding uplink subframe. The symbols repeated in the special subframe can be coherently combined at the receiver with corresponding symbols transmitted in a downlink or uplink subframe to improve decoding perfor- (Continued)

mance, reduce errors, improve channel estimation, and increase system capacity.

10 Claims, 16 Drawing Sheets

Related U.S. Application Data

(60) Provisional application No. 62/544,222, filed on Aug. 11, 2017.

(56) References Cited

U.S. PATENT DOCUMENTS

| | | |
|---|---|---|
| 2016/0212735 A1 | 7/2016 | Nogami et al. |
| 2018/0102881 A1 | 4/2018 | Cheng et al. |
| 2018/0234951 A1 | 8/2018 | Somichetty et al. |
| 2020/0136791 A1 | 4/2020 | You et al. |

FOREIGN PATENT DOCUMENTS

| | | |
|---|---|---|
| WO | 2016165126 A1 | 10/2016 |
| WO | 2016190620 A1 | 12/2016 |
| WO | 2017079539 A1 | 5/2017 |

OTHER PUBLICATIONS

Huawei, et al., Way FOrward on Prioritization of NB-IoT power consumption, 3GPP TSG RAN Meeting #76, West Palm Beach, USA, Jun. 5-9, 2017, RP-171440.
ETSI, LTE; Evolved Universal Terrestrial Radio Access (E-UTRA); Physical channels and modulation (3GPP TS 36.211 version 14.2.0 Release 14).
ETSI, Evolved Universal Terrestrial Radio Access (E-UTRA); Radio Resource Control (RRC); Protocol specification (3GPP TS 36.331 version 14.3.0 Release 14).
Panasonic, MPDCCH repetition transmitted in DwPTS, 3GPP TSG RAN WG1 Meeting #81, Fukuoka, Japan, May 25-29, 2015, R1-152906.
Bgpp TS 36.213 version 14.3.0, Release 14, LTE; Evolved Universal Terrestrial Radio Access (E-UTRA); Physical layer procedures, ETSI TS 136 213 V14.3.0 (Aug. 2017).

SPECIAL SUBFRAME UTILIZATION FOR NB-IOT TRANSMISSION IN TDD MODE

RELATED APPLICATIONS

The present application is a continuation of U.S. patent application Ser. No. 16/342,116, which was filed on Apr. 15, 2019, which is a national stage application of PCT/EP2018/071278, which was filed Aug. 6, 2018, and claims benefit of U.S. Provisional Application 62/544,222, which was filed Aug. 11, 2017, the disclosures of each of which are incorporated herein by reference in their entirety.

TECHNICAL FIELD

The present disclosure relates generally to wireless communication networks for the Narrowband Internet of Things (NB-IoT) and, more particularly to Time Division Duplex (TDD) communications for NB-IoT transmissions.

BACKGROUND

Long Term Evolution (LTE) supports both Frequency Division Duplex (FDD) operation and TDD operation. In the case of FDD operation, different carrier frequencies are used for downlink and uplink transmissions. The type 1 frame structure is used for FDD operations. In the case of TDD operations, the same carrier frequencies are used for both uplink and downlink transmissions. The type 2 frame structure is used for TDD operations. In the type 2 frame, the subframes within a radio frame are allocated for use as downlink subframes, uplink subframes, or special subframes. Downlink subframes are used for downlink transmissions and uplink subframes are used for uplink transmissions. Switching between downlink and uplink occurs during special subframes.

The special subframe is divided into three parts: the Downlink Pilot Time Slot (DwPTS), the Guard Period (GP) and the Uplink Pilot Time Slot (UpPTS). In LTE, the DwPTS is sometimes treated like a normal downlink subframe and used for data transmission, although the length of the DwPTS is less than a normal subframe and the amount of data that can be transmitted is correspondingly smaller. The UpPTS is not typically used for data transmission, but may be used for channel sounding or random access. The UpPTS can also be left blank and serve as an extended guard period.

The Third Generation Partnership Project (3GPP) is currently developing a standard called Narrowband Internet of Things (NB-IoT) that is specifically adapted for the Internet of Things (IoT). This new radio access technology is intended to provide improved indoor coverage, support for massive numbers of low throughput devices, low delay sensitivity, ultralow device cost, low device power consumption, and optimized network architecture. The NB-IoT radio access technology supports three modes of operation: (1) standalone operation where NB-IoT uses a standalone carrier in any available spectrum; (2) guard band operation where NB-IoT uses the spectrum within an LTE guard band; and (3) inband operation where NB-IoT uses spectrum within a normal LTE carrier.

The 3GPP has recently approved a work item on NB-IoT enhancements to support TDD operation. In LTE systems, the DwPTS field of the special subframe may be used to transmit user data or control information on the downlink. By using a proper transport block size and taking advantage of the fact that the Transmission Time Interval (TTI) length is always equal to one millisecond, a special subframe can be used to carry autonomous data (e.g., new data, new scheduling information, etc.), and therefore be treated as any other available downlink subframe.

In contrast to conventional LTE systems, NB-IoT transmissions use a large number of repetitions and variable Resource Unit (RU) lengths. Because NB-IoT uses repetitions and variable TTI lengths, the usage of the DwPTS for downlink transmissions cannot be applied in the same way for NB-IoT. A further complication is that NB-IoT has three modes of operation. It would be desirable to use a common TDD design for all three modes of operation.

SUMMARY

The present disclosure relates to a new TDD mode designed for NB-IoT transmissions in NB-IoT communication networks. In exemplary embodiments, a radio node such as a base station or user equipment (UE) is configured for TDD operation and can make use of the available symbols in the DwPTS or UpPTS respectively for NB-IoT transmissions. In one example, a base station can use OFDM symbols in the DwPTS to repeat in a predetermined manner some of the OFDM symbols transmitted in an immediately preceding downlink subframe, or in a succeeding downlink subframe. Similarly, a UE can use symbols in the UpPTS to repeat in a predetermined manner some of the symbols transmitted in the immediately succeeding uplink subframe, or in a preceding uplink subframe. The symbols repeated in the special subframe can be coherently combined at the receiver with corresponding symbols transmitted in a downlink or uplink subframe to improve decoding performance and reduce the Block Error Rate (BLER), which will increase system capacity. The radio node can also take advantage of the redundant information in the OFDM symbols carried on the DwPTS, and UpPTS fields (e.g., for improving the channel estimation to reduce the number of required repetitions), which can translate into lower power consumption and longer battery life.

According to one aspect of the disclosure, in the case of NB-IoT transmissions without repetition (i.e., where the number of repetitions equals one), the special subframe can be used for rate matching. Where the number of repetitions for a downlink or uplink transmission equals one (meaning that no resource units are repeated), and the number of symbols used by the DwPTS or UpPTS of the special subframe is large enough according to a threshold (e.g., greater than the threshold), the special subframe can be counted as part of the resource unit and the available symbols in the DwPTS or UpPTS of the special subframe are used for rate matching. If the number of symbols in the DwPTS or UpPTS of special subframe is small according to the threshold (e.g., less than the threshold), the special subframe may be counted as part of the resource unit, but the symbols in the DwPTS or UpPTS of special subframe are not used for rate matching.

One aspect of the disclosure comprises methods implemented by a transmitting radio node of Time Division Duplex (TDD) communication. In one embodiment, the method comprises transmitting a first subframe comprising a plurality of symbols, the first subframe comprising one of a downlink subframe and an uplink subframe in a radio frame used for TDD communications, and repeating resource elements in one or more symbols of the first subframe in a special subframe in the radio frame, said special subframe comprising a guard period for switching the radio node between downlink and uplink transmission modes.

Another aspect of the disclosure comprises a transmitting radio node in a wireless communication network configured to TDD communications. In one embodiment, the transmitting radio node comprises an interface circuit for transmitting signals to a second radio node in the wireless communication network, and a processing circuit. The processing circuit is configured to transmit data in a first subframe comprising a plurality of symbols, the first subframe comprising one of a downlink subframe and an uplink subframe in a radio frame used for TDD communications, and repeat resource elements in one or more symbols of the first subframe in a special subframe, the special subframe comprising a guard period for switching the radio node between downlink and uplink transmission modes.

One aspect of the disclosure comprises methods implemented by a receiving radio node of Time Division Duplex (TDD) communication. In one embodiment, the method comprises receiving a first subframe comprising a plurality of symbols, the first subframe comprising one of a downlink subframe and an uplink subframe in a radio frame used for TDD communications, and receiving, in the radio frame, a special subframe comprising a guard period for switching the radio node between downlink and uplink transmission modes, said special subframe containing a repetition of resource elements in one or more symbols of the first subframe.

Another aspect of the disclosure comprises a receiving radio node in a wireless communication network configured to TDD communications. In one embodiment, the receiving radio node comprises an interface circuit for transmitting signals to a second radio node in the wireless communication network, and a processing circuit. The processing circuit is configured to receive a first subframe comprising a plurality of symbols, the first subframe comprising one of a downlink subframe and an uplink subframe in a radio frame used for TDD communications, and receive, in the radio frame, a special subframe comprising a guard period for switching the radio node between downlink and uplink transmission modes, said special subframe containing a repetition of resource elements in one or more symbols of the first subframe.

DETAILED DESCRIPTION

Figure 1:
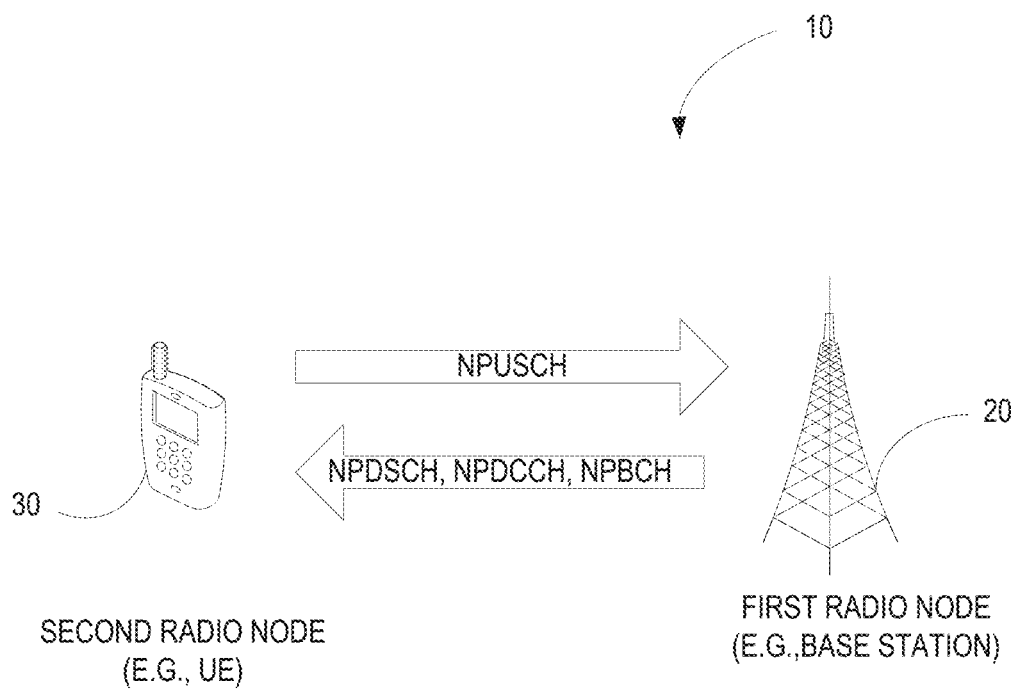
FIG. 1 illustrates a NB-IoT communication network employing TDD.

FIG. 1 illustrates communications between a base station 20 and a UE 30 in a wireless communication network 10. The base station 20 is sometimes referred to in applicable standards as an Evolved Node B (eNB) or 5G Node B (gNB). The UE 30, sometimes referred to as a wireless device, may comprise a cellular telephone, smart phone, laptop computer, notebook computer, tablet, machine-to-machine (M2M) communication device (also referred to as machine-type communication (MTC) device), or other device with wireless communication capabilities. The term "radio node" is used herein to refer generically to the base station 20, UE 30, or other device that communicates using radio frequency signals. As shown in FIG. 1, the base station 20 transmits data to the UE 30 in the downlink on the Narrowband Physical Downlink Shared Channel (NPDSCH), the Narrowband Physical Downlink Control Channel (NPDCCH), and the Narrowband Physical Broadcast Channel (NPBCH). The UE 30 transmits data to the base station 20 in the uplink on the Narrowband Physical Uplink Shared Channel (NPUSCH).

Figure 2A:
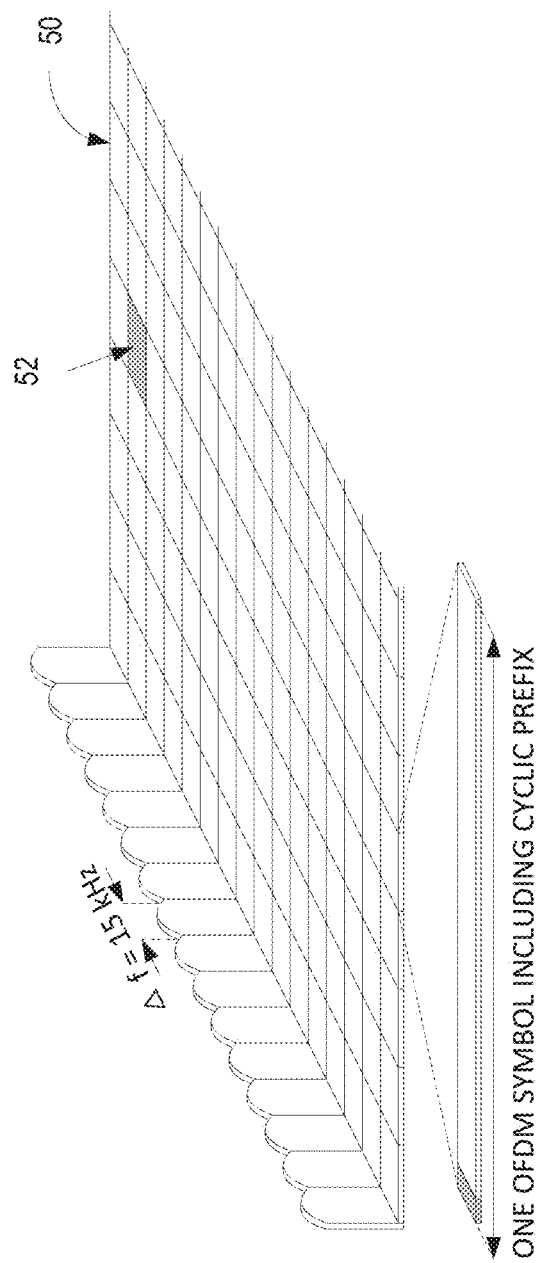
FIG. 2A illustrates radio resources used in a NB-IoT communication network.

NB-IoT communication networks 10 use Orthogonal Frequency Division Multiplexing (OFDM) in the downlink and Single Carrier Frequency Division Multiple Access (SC-FDMA) in the uplink. The available radio resources in NB-IoT communication networks 10 can be viewed as a time-frequency grid 50 as shown in FIG. 2A. In the time domain, the physical resources are divided into subframes. Each subframe includes a number of symbols (e.g. OFDM symbols for the downlink and SC-FDMA symbols for the uplink). For a normal cyclic prefix (CP) length, suitable for use in situations where multipath dispersion is not expected to be extremely severe, a subframe comprises fourteen symbols. A subframe comprises twelve symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element (RE) 52.

Figure 2B:
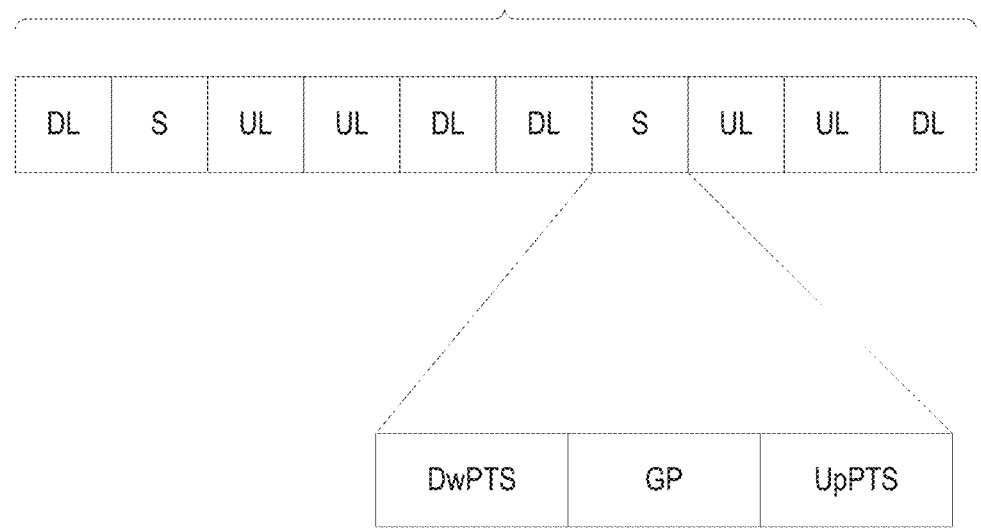
FIG. 2B illustrates the structure of an exemplary radio frame used in TDD communications.

In exemplary embodiments, the base station 20 and UE 30 are configured to support TDD operation. In the case of TDD operations, the same carrier frequencies are used for both uplink and downlink transmissions. The type 2 frame structure is used for TDD operations. FIG. 2B illustrates an exemplary frame structure for TDD communications. In the type 2 frame structure shown in FIG. 2B, the subframes within a radio frame are allocated for use as downlink (DL) subframes, uplink (UL) subframes, or special (S) subframes. Downlink subframes are used for downlink transmissions on the NPDSCH, NPDCCH, or NPBCH and uplink subframes are used for uplink transmissions on the NPUSCH. Switching between downlink and uplink occurs during the special subframe.

Different amounts of resources (e.g., subframes) can be allocated for uplink and downlink transmissions. Table 1 below illustrates the existing LTE TDD configurations as described in 3GPP TS36.211, "Physical Channels and Modulation", V14.2.0. As seen in Table 1, subframes 0 and 5 are always allocated for downlink transmissions while subframe 2 is always allocated for uplink transmissions. The remaining subframes (except the special subframes) can then be flexibly allocated for downlink or uplink transmission depending on the TDD configuration.

TABLE 1

Uplink-downlink TDD configurations

| Uplink-downlink configuration | Downlink-to-Uplink Switch-point periodicity | Subframe number | | | | | | | | | | Number of subframes/frame | | |
|---|---|---|---|---|---|---|---|---|---|---|---|---|---|---|
| | | 0 | 1 | 2 | 3 | 4 | 5 | 6 | 7 | 8 | 9 | DL | UL | S |
| 0 | 5 ms | D | S | U | U | U | D | S | U | U | U | 2 | 6 | 2 |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

As seen in Table 1, switching from downlink to uplink transmission occurs every ten milliseconds for TDD configurations 3, 4, and 5 so that there is only one special subframe for every radio frame. For TDD configurations 0, 1, 2, and 6, the downlink to uplink switching period is five milliseconds, so that two special subframes are used for switching in every radio frame.

The TDD configuration is normally provided as part of System Information (SI) and is typically changed infrequently. According to Release 14 of the LTE specification, the TDD configuration information is contained in the SystemInformationBlockType1 message shown below.

SystemInformationBlockType1 Message

```
-- ASN1START
SystemInformationBlockType1-BR-r13 ::=  SystemInformationBlockType1
SystemInformationBlockType1 ::=   SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                         ENUMERATED {barred, notBarred},
        intraFreqReselection               ENUMERATED {allowed, notAllowed},
        csg-Indication                     BOOLEAN,
        csg-Identity                       CSG-Identity          OPTIONAL    -- Need OR
    },
    cellSelectionInfo                  SEQUENCE {
        q-RxLevMin                         Q-RxLevMin,
        q-RxLevMinOffset                   INTEGER (1..8)        OPTIONAL    -- Need OP
    },
    p-Max                              P-Max                     OPTIONAL,   -- Need OP
    freqBandIndicator                  FreqBandIndicator,
    schedulingInfoList                 SchedulingInfoList,
    tdd-Config                         TDD-Config                OPTIONAL,   -- Cond TDD
    si-WindowLength                    ENUMERATED {
                                           ms1, ms2, ms5, ms10, ms15, ms20,
                                           ms40},
    systemInfoValueTag                 INTEGER (0..31),
    nonCriticalExtension               SystemInformationBlockType1-v890-IEs  OPTIONAL
```

More specifically, the TDD-Config information element (IE) is used to specify the TDD specific physical channel configuration. The TDD-Config IE is shown below.

TDD-Config Information Element

```
-- ASN1START
TDD-Config ::=                    SEQUENCE {
    subframeAssignment                ENUMERATED {
                                          sa0, sa1, sa2, sa3, sa4, sa5, sa6},
    specialSubframePatterns           ENUMERATED {
                                          ssp0, ssp1, ssp2, ssp3, ssp4,ssp5, ssp6, ssp7,
                                          ssp8}
}
TDD-Config-v1130 ::=              SEQUENCE {
    specialSubframePatterns-v1130     ENUMERATED {ssp7, ssp9}
}
TDD-Config-v1430 ::=              SEQUENCE {
    specialSubframePatterns-v1430     ENUMERATED {ssp10}
}
TDD-ConfigSL-r12 ::=    SEQUENCE {
    subframeAssignmentSL-r12          ENUMERATED {
                                          none, sa0, sa1, sa2, sa3, sa4, sa5, sa6}
}
-- ASN1STOP
```

Table 2 below contains relevant portions of 3GPP TS 36.331 describing the contents in the TDD-Config IE.

TABLE 2

TDD-Config field descriptions specialSubframePatterns

Indicates Configuration as in TS 36.211 [21, table 4.2-1] where ssp0 points to Configuration 0, ssp1 to Configuration 1 etc. Value ssp7 points to Configuration 7 for extended cyclic prefix, value ssp9 points to Configuration 9 for normal cyclic prefix and value ssp10 points to Configuration 10 for normal cyclic prefix. E-UTRAN signals ssp7 only when setting specialSubframePatterns (without suffix i.e. the version defined in REL-8) to ssp4. E-UTRAN signals value ssp9 only when setting specialSubframePatterns (without suffix) to ssp5. E-UTRAN signals value ssp10 only when setting specialSubframePatterns (without suffix) to ssp0 or ssp5. If specialSubframePatterns-v1130 or specialSubframePatterns-v1430 is present, the UE shall ignore specialSubframePatterns (without suffix). If both specialSubframePatterns-v1130 and specialSubframePatterns-v1430 are present, the UE shall ignore specialSubframePatterns-v1130.

subframeAssignment

Indicates DL/UL subframe configuration where sa0 points to Configuration 0, sa1 to Configuration 1 etc. as specified in TS 36.211 [21, table 4.2-2]. E-UTRAN configures the same value for serving cells residing on same frequency band.

subframeAssignmentSL

Indicates UL/DL subframe configuration where sa0 points to Configuration 0, sa1 to Configuration 1 etc. as specified in TS 36.211 [21, table 4.2-2]. The value none means that no TDD specific physical channel configuration is applicable (i.e. the carrier on which MasterInformationBlock-SL is transmitted is an FDD UL carrier or the carrier on which MasterInformationBlock-SL-V2X is transmitted is a carrier for V2X sidelink communication).

Referring back to FIG. 2B, special subframes in the radio frame are divided into three parts: the DwPTS (also referred to as the downlink part), the GP, and the UpPTS (also referred to as the uplink part). The total length of the special subframe is $30{,}720 \times T_S = 1$ ms, while the individual parts of the subframe have a variable length. $T_S$ is a basic unit of time defined in the LTE specification. LTE specifies 11 different configurations for the special subframe which are shown in Table 3 below.

TABLE 3

Configuration of special subframe (lengths of DwPTS/GP/UpPTS)

| Special subframe configuration | Normal cyclic prefix | | Number of symbols/subframe | | |
|---|---|---|---|---|---|
| | DwPTS | UpPTS | DwPTS | GP | UpPTS |
| 0 | $6592 \cdot T_s$ | $2192 \cdot T_s$ | 3 | 10 | 1 |
| 1 | $19760 \cdot T_s$ | | 9 | 4 | 1 |
| 2 | $21952 \cdot T_s$ | | 10 | 3 | 1 |
| 3 | $24144 \cdot T_s$ | | 11 | 2 | 1 |
| 4 | $26336 \cdot T_s$ | | 12 | 1 | 1 |
| 5 | $6592 \cdot T_s$ | $4384 \cdot T_s$ | 3 | 9 | 2 |
| 6 | $19760 \cdot T_s$ | | 9 | 3 | 2 |
| 7 | $21952 \cdot T_s$ | | 10 | 2 | 2 |
| 8 | $24144 \cdot T_s$ | | 11 | 1 | 2 |
| 9 | $13168 \cdot T_s$ | | 3 | 10 | 1 |
| 10 | $13168 \cdot T_s$ | $13152 \cdot T_s$ | 6 | 2 | 6 |

In exemplary embodiments, the base station 20 or UE 30 can make use of the available symbols in the DwPTS or the UpPTS respectively for downlink and/or uplink NB-IoT transmissions. In one example, the base station 20 can use OFDM symbols in the DwPTS to repeat in a predetermined manner some of the OFDM symbols transmitted in a valid downlink subframe immediately preceding the special subframe or in a valid downlink subframe succeeding the special subframe. Similarly, the UE 30 can use SC-FDMA symbols in the UpPTS to repeat in a predetermined manner some of the SC-FDMA symbols transmitted in a valid uplink subframe immediately succeeding the special subframe or in a valid uplink subframe preceding the special subframe. The symbols repeated in the special subframe can be coherently combined at the receiver with corresponding symbols transmitted in a downlink or uplink subframe to improve decoding performance and reduce the Block Error Rate (BLER), which will increase system capacity. The radio node can also take advantage of the redundant information in the OFDM symbols carried on the DwPTS, and UpPTS fields (e.g., for improving the channel estimation to reduce the number of required repetitions), which can translate into lower power consumption and longer battery life.

In some embodiments, the special subframe is used for downlink or uplink transmissions only if the number of OFDM or SC-FDMA symbols in the DwPTS or UpPTS respectively meets a threshold requirement. In current versions of NB-IoT, valid and invalid subframes are indicated by a bitmap, which has a predetermined maximum number of bits (e.g., 40 bits for inband and 10 bits for standalone). Because the length of the bitmap is limited, special subframes can be omitted from the bitmap to conserve bits and the threshold requirement can be used to determine whether a special subframe is valid. If the special subframe is valid (e.g. # of symbols in the DwPTS or UpPTS meets a threshold requirement), the subframe is used for downlink or uplink transmissions. If the special subframe is invalid (e.g. # of symbols in the DwPTS or UpPTS does not meet a threshold requirement), the subframe is not used for downlink or uplink transmissions.

In the case of downlink transmissions from the base station 20 to the UE 30, OFDM symbols in the DwPTS are used to repeat OFDM symbols transmitted in the immediately preceding subframe, or in a succeeding downlink frame, on the NPDSCH, NPDCCH, or NPBCH. In one embodiment, OFDM symbols in the DwPTS are used to repeat OFDM symbols in a downlink subframe carrying SI. In another embodiment, OFDM symbols in the DwPTS are used to repeat OFDM symbols in a downlink subframe carrying synchronization signals, such as the Primary Synchronization Signal (PSS) and Secondary Synchronization Signal (SSS).

Figure 3:
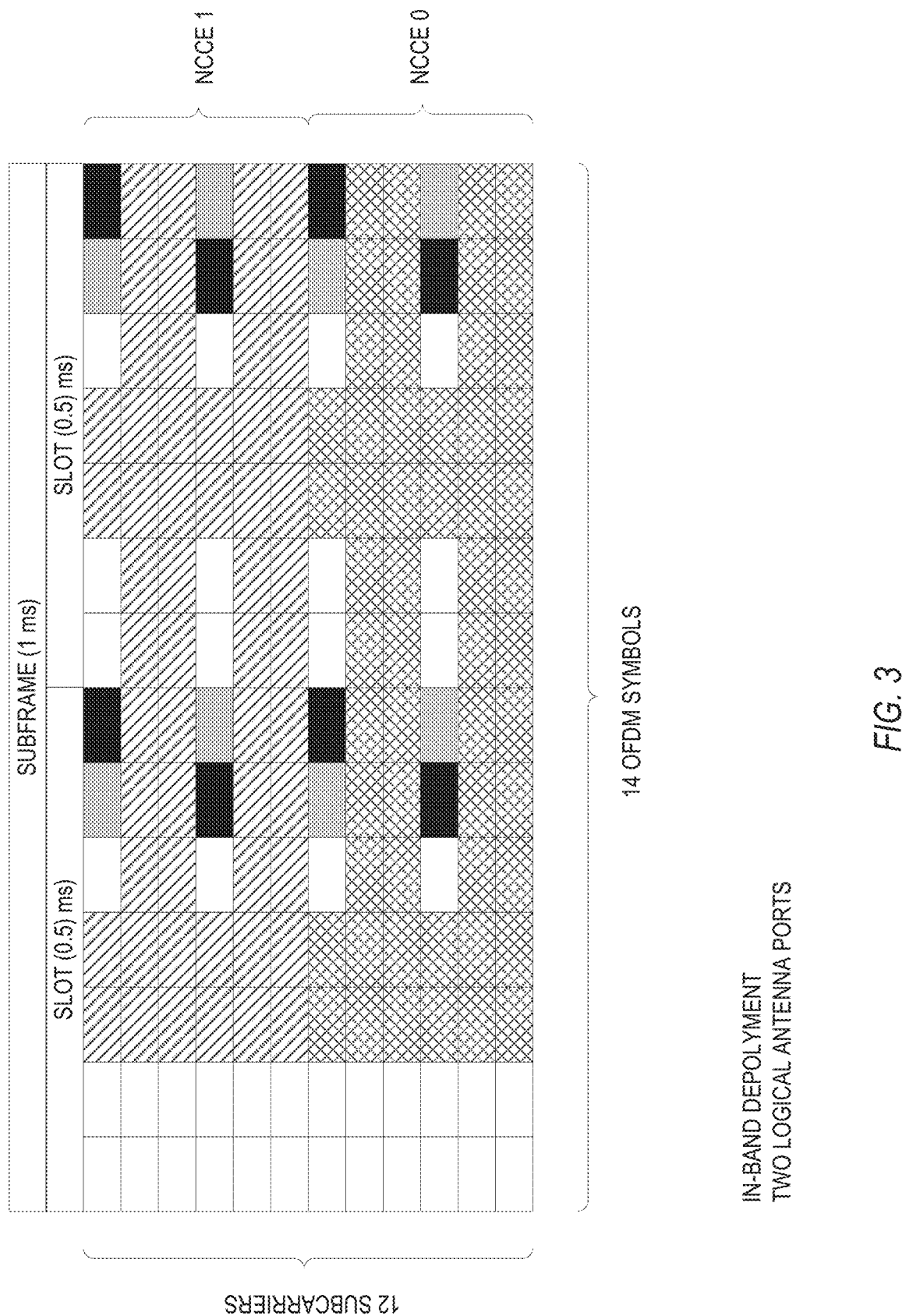
FIG. 3 illustrates resource mapping in an exemplary downlink subframe for TDD communications.

The NPDCCH, for example, is used to transmit downlink scheduling information (indicating which UE 30 is scheduled to receive a downlink transmission), uplink grant information (indicating uplink resources to be used by the UE 30 for uplink transmissions), paging notifications, and indications of changes in SI. For NB-IoT, the number of NPDCCH repetitions can be 1, 2, 4, 8, 16, 32, 64, 128, 256, 512, 1024, and 2048. The NPDCCH subframe is split into Narrowband Control Channel Elements (NCCEs) 0 and 1, as shown in FIG. 3. NCCE 0 uses the lowest 6 subcarriers, and NCCE 1 uses the highest 6 subcarriers. The number of resource elements (REs) used by NCCE depends on the deployment mode (standalone, in-band, or guard-band), and number of logical antenna ports.

FIG. 3 illustrates an exemplary resource mapping for NPDCCH for an in-band deployment and two logical antenna ports. The resource elements (REs) carrying Narrowband Reference Signals (NRSs) and cell-specific reference signals (CRSs) (i.e., the REs depicted in black and grey) can be shifted up or down depending on the cell identity. The NRS is used by a UE 30 for channel estimation and to perform downlink measurements. The NRSs are mapped using eight resource elements per subframe per antenna port in subframes used for transmitting NPBCH, NPDCCH, and NPDSCH. In some special subframe configurations, the number of OFDM symbols in the DwPTS does not contain enough to carry one NCCE. For these special subframe configurations, the special subframe is not used for the downlink transmission of the NPDCCH. In this case, it is not necessary to include the special subframe in the configuration of the NPDCCH search space. Therefore, in some embodiments, the special subframe is used for downlink transmission on the NPDCCH and included in the NPDCCH search space for some special subframe configurations but not for others.

Figure 4:
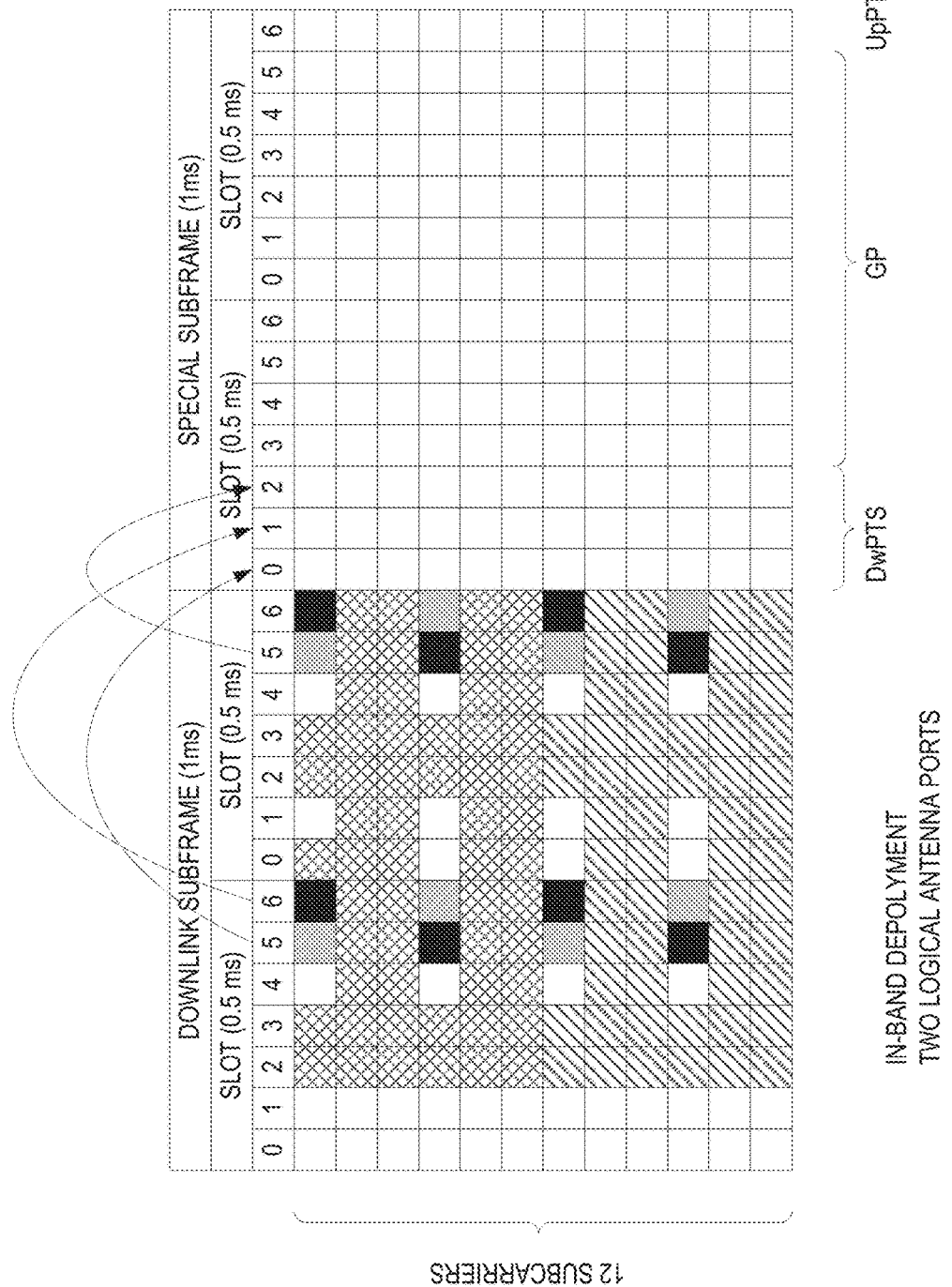
FIG. 4 illustrates mapping of OFDM symbols from a downlink subframe to a special subframe.

FIG. 4 illustrates one example of how OFDM symbols in a downlink subframe carrying the NPDCCH can be mapped and repeated in the DwPTS part of the special subframe. The example shown in FIG. 4 assumes special subframe configuration 0 (Table 2) in which the DwPTS includes 3 OFDM symbols. OFDM symbols 5, 6, and 12 in the downlink subframe are mapped to OFDM symbols 0, 1, and 2 in the DwPTS. It may be observed in this example that only OFDM symbols in the downlink subframe containing NRSs are repeated. The OFDM symbols containing NRSs are mapped in ascending order to the special subframe until the last available OFDM in the DwPTS is filled. It can also be observed that the OFDM symbols in the downlink subframe are mapped to different index positions in the DwPTS.

There are other scenarios where the DwPTS includes a larger number of OFDM symbols. In cases where a large number of OFDM symbols in the DwPTS are available to use, the OFDM symbols containing NRSs can be prioritized and mapped first to the special subframe in ascending order, descending order, or according to some other scheme. Once all the OFDM symbols containing NRSs are mapped, the remaining OFDM symbols can be mapped in either ascending, descending order or according to some other specified order until the available OFDM symbols in the DwPTS are filled.

In some cases, the OFDM symbols in the special subframe may include NRSs specific to the special subframe. These NRSs may occupy different positions than the NRSs in the downlink subframe. Also, for inband deployment scenarios, the OFDM symbols in the special subframe may include legacy Cell-Specific Reference Signals (CRSs). Therefore, it may be necessary to omit certain REs when an OFDM symbol is mapped from the downlink subframe to the DwPTS of the special subframe. That is, when an OFDM symbol is mapped from the downlink subframe to the special subframe, REs at locations corresponding to NRSs or legacy CRSs in the special subframe can be omitted (i.e., these REs are not mapped), and replaced by the NRS or CRS in the special subframe.

FIGS. 5A through 5D illustrate non-exclusive examples of how OFDM symbols can be mapped from the downlink subframe to the DwPTS of the special subframe. For simplicity, the examples in FIGS. 5A through 5D show mapping of a single OFDM symbol. In most use cases, however, two or more OFDM symbols will be repeated. The same principles apply when several symbols are repeated in the DwPTS of the special subframe.

Also, it may be noted that FIGS. 5A through 5D show the NRSs in the DwPTS of the special subframe at the same position as the regular downlink subframe, which may not be the case for some special subframe configurations. That is, the NRSs in the special subframe can be placed in different OFDM symbols, and generated accordingly, e.g., based on the OFDM symbol index in the special subframe.

Figure 5A:
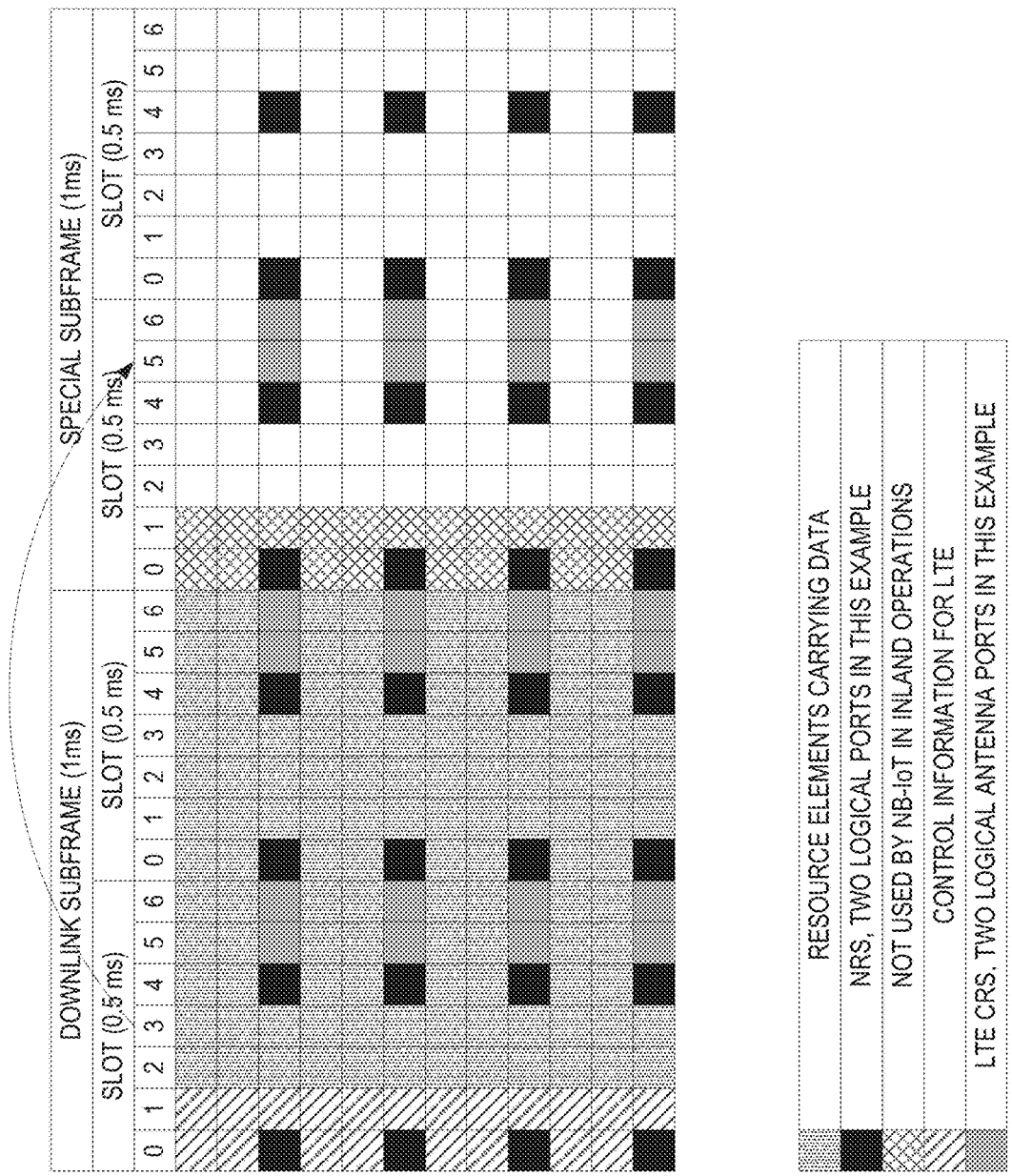
FIG. 5A illustrates mapping of an OFDM symbol in a downlink subframe containing data only to an OFDM symbol in the special subframe containing reference signals.

FIG. 5A, illustrates a case where an OFDM symbol from the downlink subframe not containing reference signals (e.g., OFDM symbol 3) is mapped to and repeated in an OFDM symbol in the special subframe that does contain an NRS (e.g., OFDM symbol 5). In this case, the REs in the OFDM symbol where the NRSs are located cannot be repeated. These REs are omitted and replaced by NRSs specific to the special subframe. This same approach is used where an OFDM symbol from the downlink subframe not containing reference signals (e.g., OFDM symbol 3) is mapped to and repeated in an OFDM symbol in the special subframe carrying legacy CRSs (e.g., OFDM symbol 4). In this case, the REs in the OFDM symbol where the CRSs are located are omitted and replaced by the legacy CRSs.

Figure 5B:
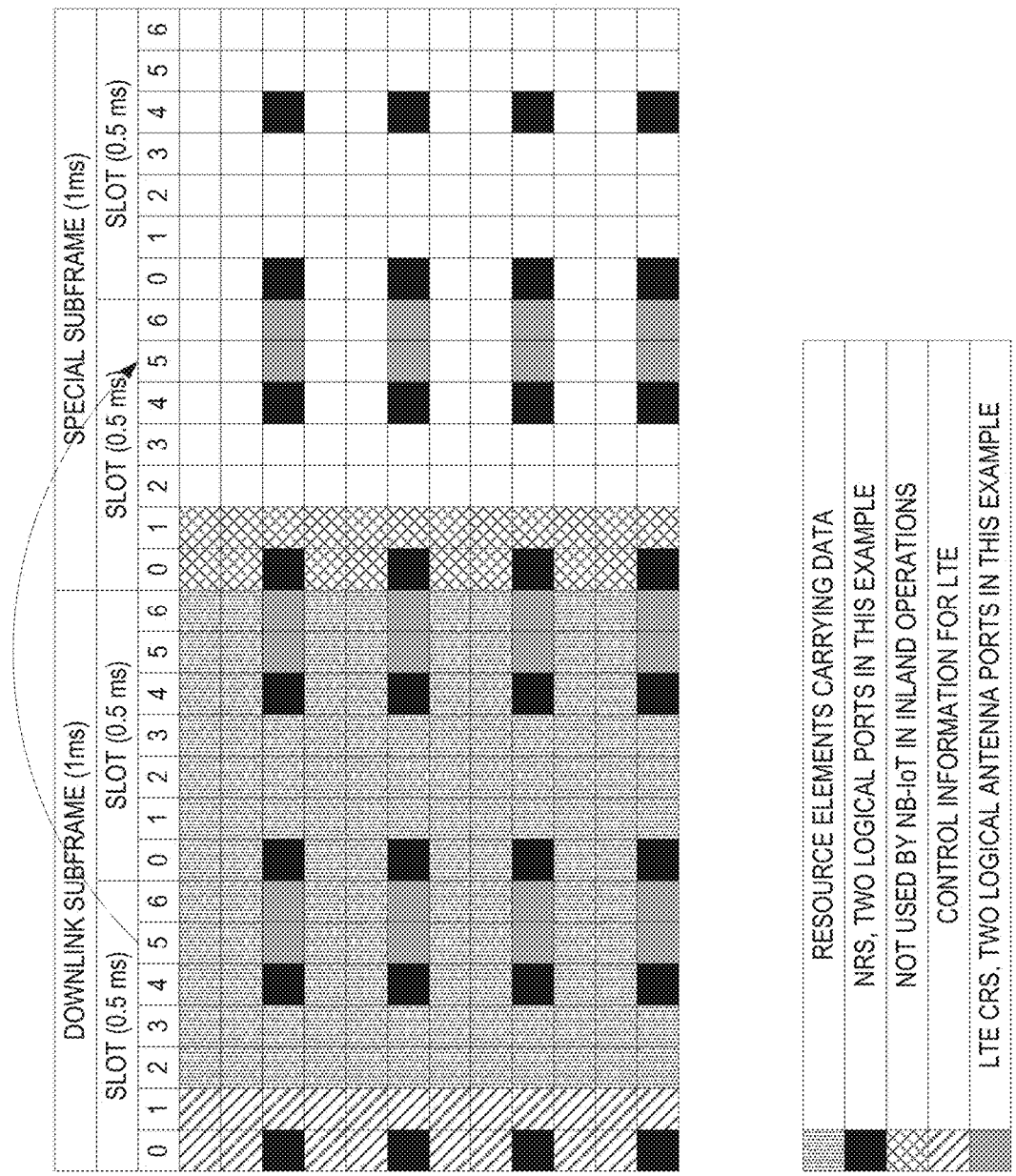
FIG. 5B illustrates mapping of an OFDM symbol in a downlink subframe containing reference signal to an OFDM symbol in the special subframe containing reference signals at the same locations.

FIG. 5B, illustrates a case where an OFDM symbol from the downlink subframe containing NRSs (e.g., OFDM symbol 5) is mapped to and repeated in an OFDM symbol in the special subframe that contains NRSs at the same positions (e.g., OFDM symbol 5). In this case, only the REs containing user data are repeated in the special subframe.

Figure 5C:
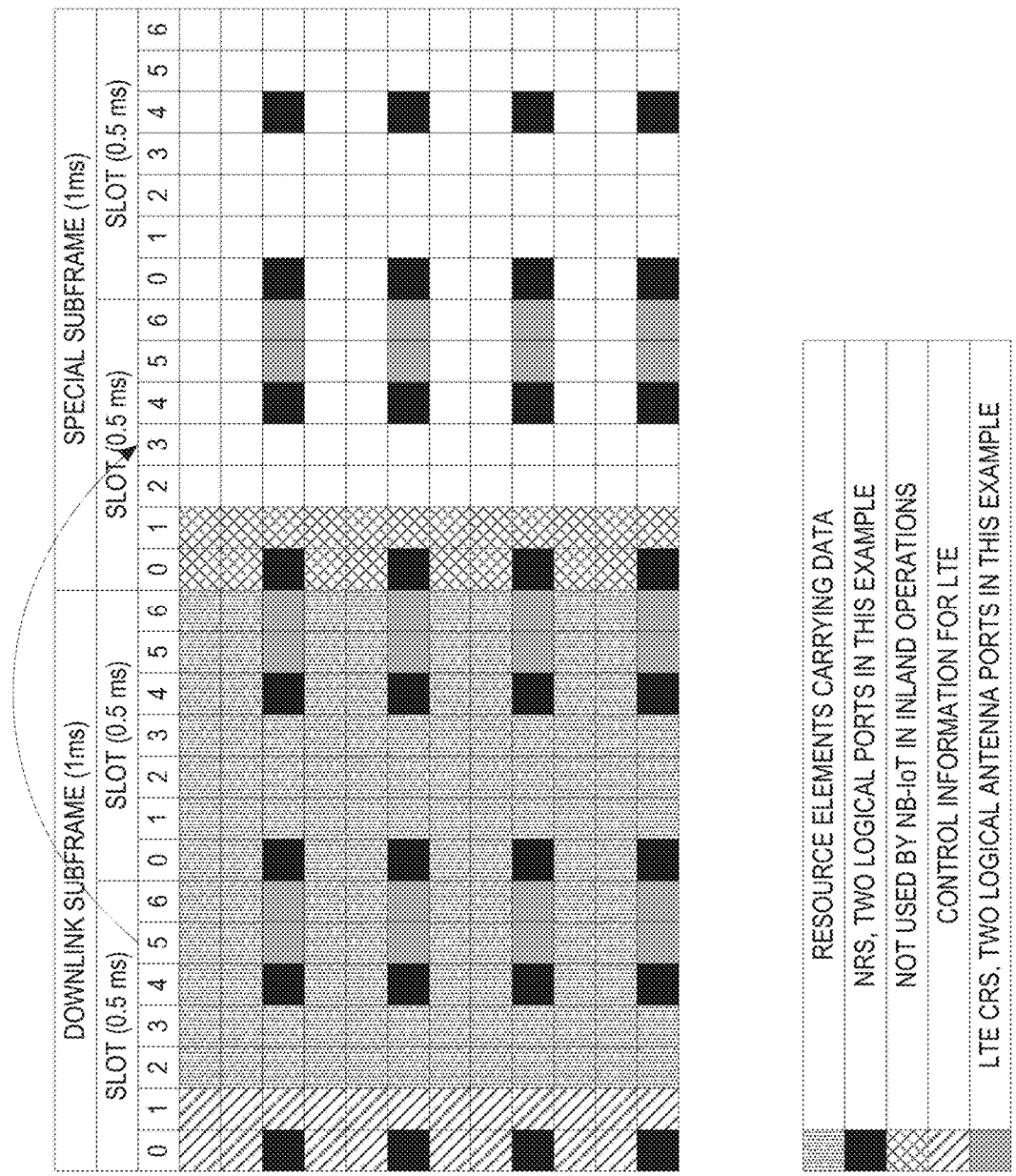
FIG. 5C illustrates mapping of an OFDM symbol in a downlink subframe containing reference signals to an OFDM symbol in the special subframe having no reference signals.

FIG. 5C, illustrates a case where an OFDM symbol from the downlink subframe containing NRSs (e.g., OFDM symbol 5) is mapped to and repeated in an OFDM symbol in the special subframe that does not contain an NRS at the same position (e.g., OFDM symbol 3). In this case, several mapping approaches are possible. In a first approach, only the REs carrying user data are repeated, and the reference signal positions are left empty. In a second approach, the entire OFDM symbol, i.e., user data plus reference signal, is repeated. In a third approach, only the REs carrying user data are repeated in the special subframe and new NRSs specific to the special subframe are generated to fill the empty REs. That is the data REs are repeated, but the reference signal is newly generated.

Figure 5D:
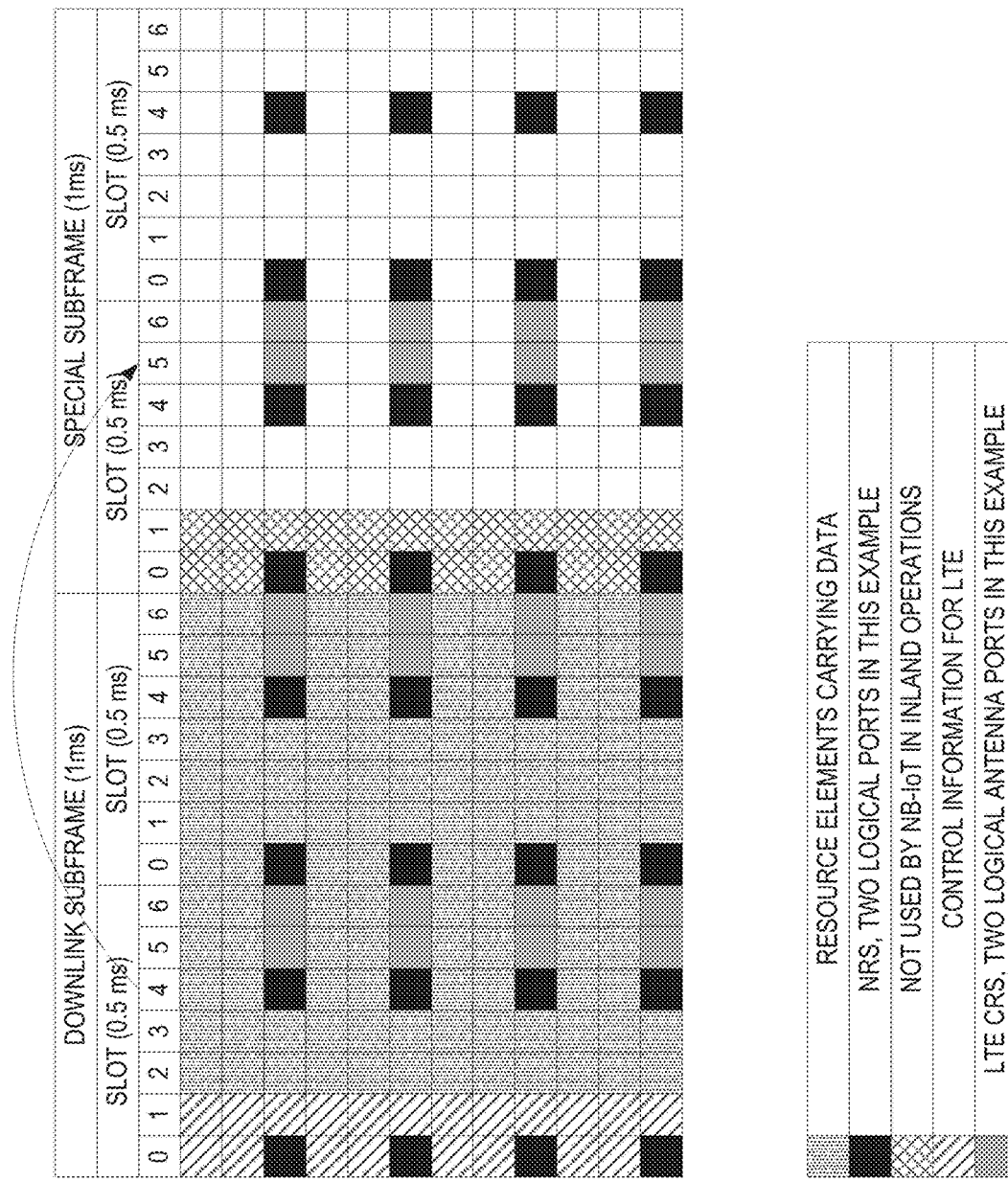
FIG. 5D illustrates mapping of an OFDM symbol in a downlink subframe containing reference signals to an OFDM symbol in the special subframe containing a different type of reference signal.

FIG. 5D, illustrates a case where an OFDM symbol from the downlink subframe containing NRSs (e.g., OFDM symbol 5) is mapped to and repeated in an OFDM symbol in the special subframe that contains legacy CRSs at the same locations (e.g., OFDM symbol 5). In this case, only the REs containing user data are repeated in the special subframe and the NRSs in the OFDM symbol are replaced by the CRSs in the special subframe.

In the case of uplink transmissions from the UE 30 to the base station 20, SC-FDMA symbols in the UpPTS may be used to repeat SC-FDMA symbols transmitted in the immediately succeeding uplink subframe, or in a preceding uplink subframe on the NPUSCH. The NPUSCH, carries uplink user data and control information from higher layers (format 1). In addition, the NPUSCH can carry Hybrid Automatic Repeat Request (HARQ) acknowledgements for NPDSCH (format 2). The maximum Transmit Block Size (TBS) is 1000 bits and the subcarrier spacing can be 15 KHz or 3.75 KHz. Multi-tone and single-tone transmissions are supported. Quadrature Phase Shift Keying (QPSK) is used for multi-tone transmissions, while single tone uses π/2-BPSK or π/4-QPSK to reduce the peak-to-average power ratio. The smallest unit to map a transport block (TB) is the Resource Unit (RU), which depends on the user's bandwidth allocation and NPUSCH format. The number of repetitions for NPUSCH are 1, 2, 4, 8, 16, 32, 64, 128, and 256.

Figure 6:
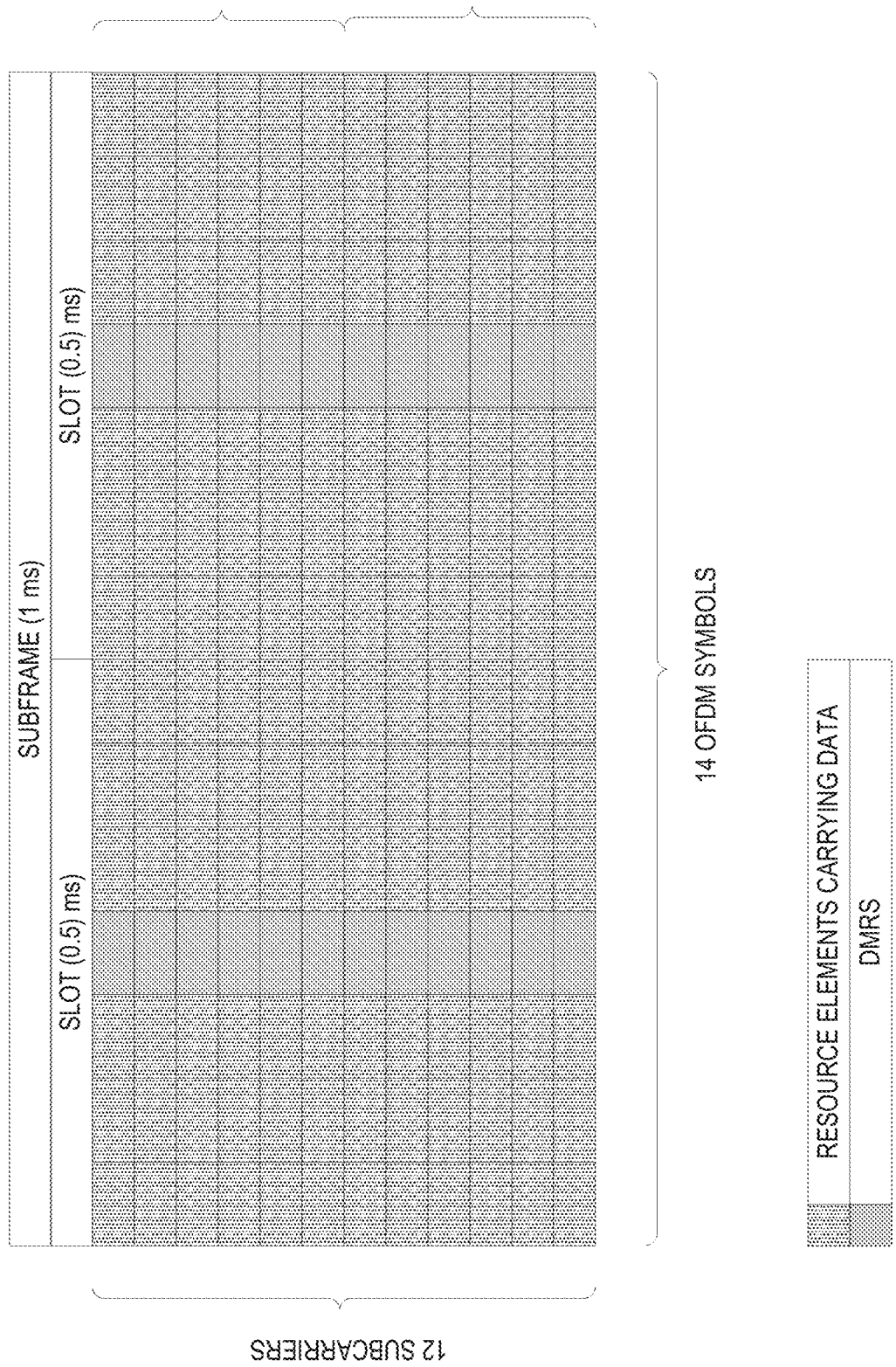
FIG. 6 illustrates resource mapping in an exemplary uplink subframe for TDD communications.

FIG. 6 illustrates one example of the resource mapping for NPUSCH. For 15 kHz subcarrier spacing, the SC-FDMA symbol in the center of each slot carries Demodulation Reference Symbols (DMRSs), which allows the base station 20 to estimate the uplink channel conditions.

Figure 7:
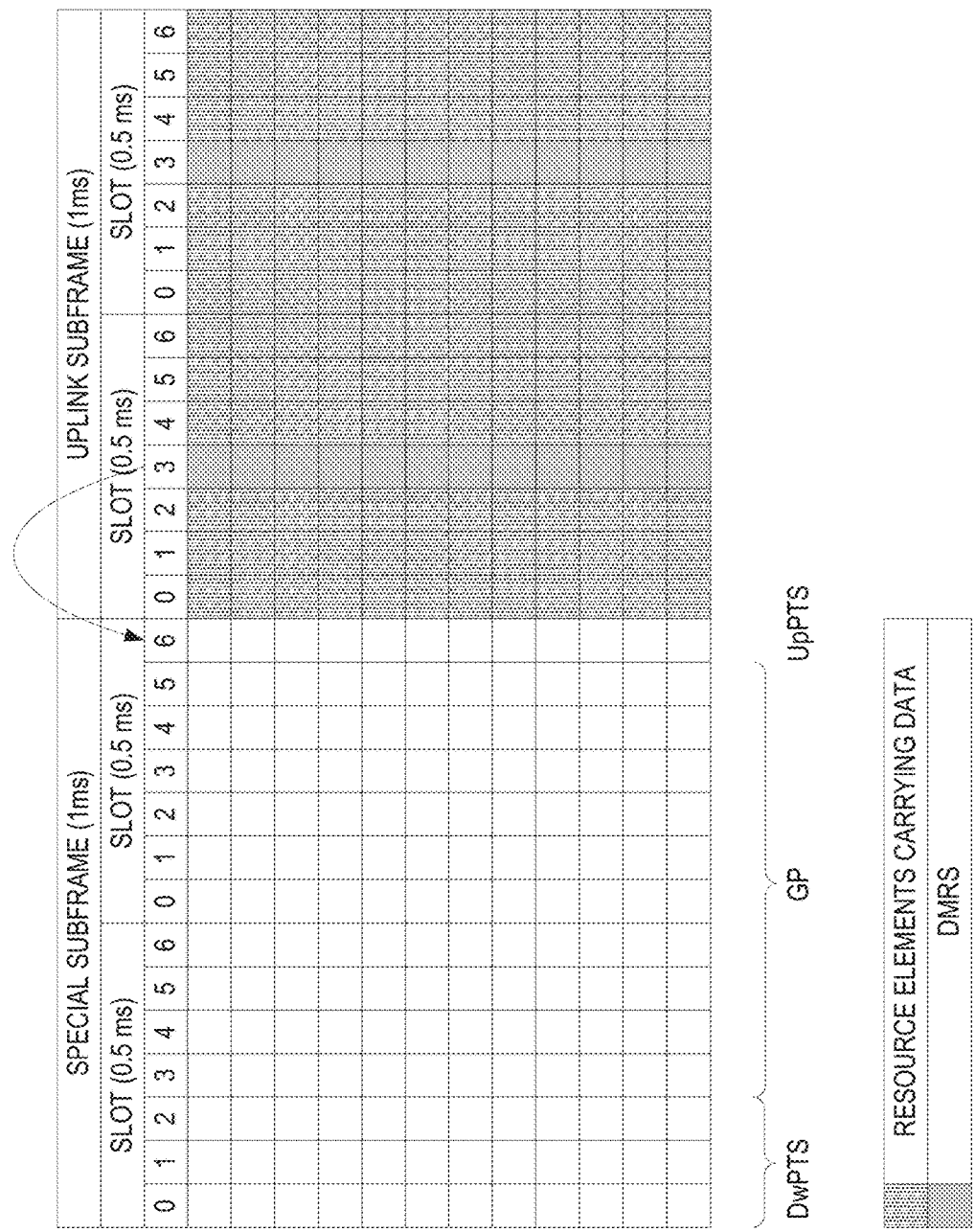
FIG. 7 illustrates mapping of symbols from an uplink subframe to a special subframe.

FIG. 7 illustrates one example of how SC-FDMA symbols in a succeeding uplink subframe carrying the NPUSCH can be mapped to and repeated in the UpPTS part of the special subframe. This example is based on NPUSCH format 1, which has one DMRS per slot. In case of NPUSCH format 2, there are 3 DMRS's per slot. This example assumes special subframe configuration 0 (Table 2) in which the UpPTS includes 1 SC-FDMA symbol. SC-FDMA symbol 3 in the uplink subframe following the special subframe is mapped to SC-FDMA symbol 6 in the second slot of the UpPTS. It may be observed in this example that only one SC-FDMA symbol in the uplink subframe containing a DMRS is mapped. If more SC-FDMA symbols are available in the UpPTS, the SC-FDMA symbols in the uplink subframe containing DMRSs are mapped to the UpPTS of the special subframe unit in ascending order, descending order, or some other specified order until all of the available SC-FDMA symbols in the UpPTS are filled.

Where a large number of SC-FDMA symbols in the UpPTS are available to use, the SC-FDMA symbol containing DMRSs can be prioritized and mapped first to the special subframe in ascending order, descending order, or according to some other scheme. Once all the SC-FDMA symbols containing DMRSs are mapped, the remaining SC-FDMA symbols can be mapped to the UpPTS of the special subframe unit in either ascending, descending or some other specified order until the available SC-FDMA symbols in the UpPTS are filled.

In addition to using the special subframes to repeat SC-FDMA symbols in a downlink subframe or uplink subframe, the DwPTS and/or UpPTS can be used to transmit other data. In one example, the UE 30 transmits an uplink reference signal in one or more SC-FDMA symbols in the special subframe. In another example, the UE 30 transmits an uplink scheduling request or Sounding Reference Signal (SRS) in one or more SC-FDMA symbols in the UpPTS of the special subframe. Similarly, the base station 20 can transmit NRSs (not necessarily at the same positions as the normal subframe) in one or more OFDM symbols in the DwPTS of the special subframe.

The special subframe can also be used to adjust a timing advance. For example, if a UE 30 far from the base station 20 is scheduled to use the UpPTS, the UE 30 may need a large timing advance. The timing advance may be more than the GP duration in the special subframe. In this case, one or more of the OFDM symbols used in the DwPTS can be left blank and thus used for accommodating the timing advance of the UE 30 scheduled to transmit in the UpPTS.

In the case of NB-IoT transmissions without repetition (i.e., where the number of repetitions equals one), the special subframe can be used in a different way. As described earlier, there are several different special subframe configurations, and some of them have a very large number of OFDM symbols available for the DwPTS. In cases where the number of repetitions for the NPDSCH or NPDCCH equal one (meaning that no resource units are repeated), and the number of OFDM symbols used by DwPTS is large enough according to a threshold (e.g., greater than the threshold), the special subframe is counted as part of a resource unit and rate matching is performed using the available OFDM symbols in the DwPTS. Note that for the inband case, some of the OFDM symbols in the DwPTS may be reserved for the legacy LTE control channels. The reserved OFDM symbols are not used for rate matching. On the other hand, if the number of OFDM symbols used by DwPTS is small according to the threshold (e.g., less than the threshold), the special subframe may be counted as part of a resource unit containing multiple subframes, but the OFDM symbols in the special subframe are not used for rate matching.

To perform rate matching, the base station 20 can either 1) use the same code rate as a resource unit without a special subframe and adjust the TBS in the resource unit that contains the special subframe to fill the available OFDM symbols, or 2) use the same size TBS as a resource unit without a special subframe and adjust the code rate in the resource unit that contains the special subframe to fill the available OFDM symbols. The OFDM symbols allocated to the GP and UpPTS can be left blank.

Figure 8A:
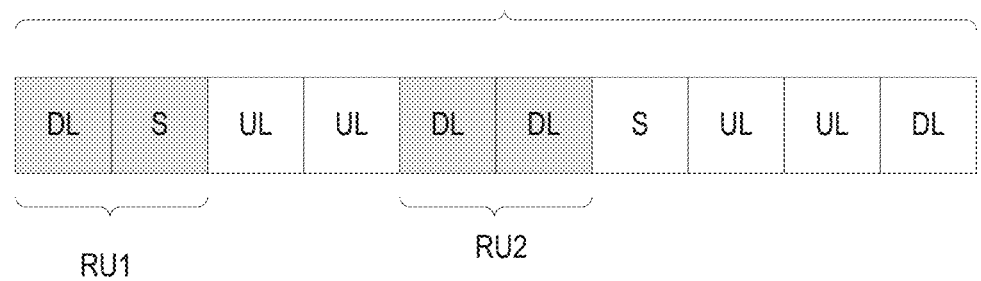
FIGS. 8A and 8B illustrate rate matching using symbols in special subframes.
Figure 8B:
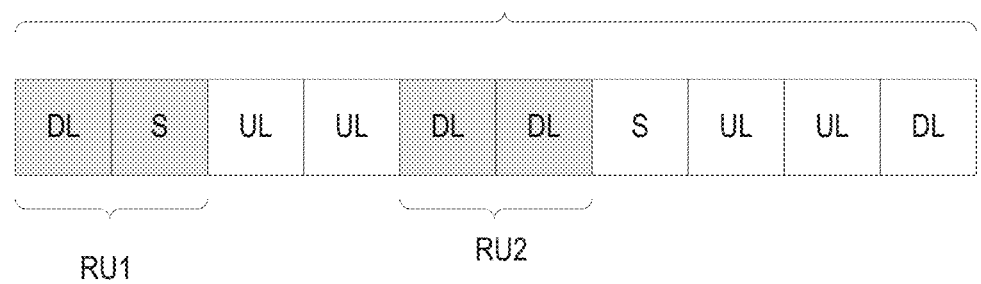

FIGS. 8A illustrates examples where each resource unit comprises two subframes. FIG. 8A illustrates the case where the number of OFDM symbols in the DwPTS meets the threshold requirement. The shading indicates the subframes used for rate matching. In this example, RU1 includes a special subframe and the available OFDM symbols in the DwPTS are used for rate matching. FIG. 8B illustrates the case where the number of OFDM symbols in the DwPTS does not meet the threshold requirement. In this example, RU1 includes a special subframe (i.e., the special subframe is counted as part RU1), but the available OFDM symbols in the DwPTS are not used for rate matching. In this case, the code rate and/or TBS are adjusted to fit the data in the downlink subframe.

This rate matching technique using the special subframe can also be applied to the NPUSCH when the number of repetitions for the NPUSCH equals one. In this case, the UE 30 can use available SC-FDMA symbols in the UpPTS of the special subframe for rate matching when the number of SC-FDMA symbols in the UpPTS is large enough according to the threshold (e.g., greater than the threshold).

Figure 9:
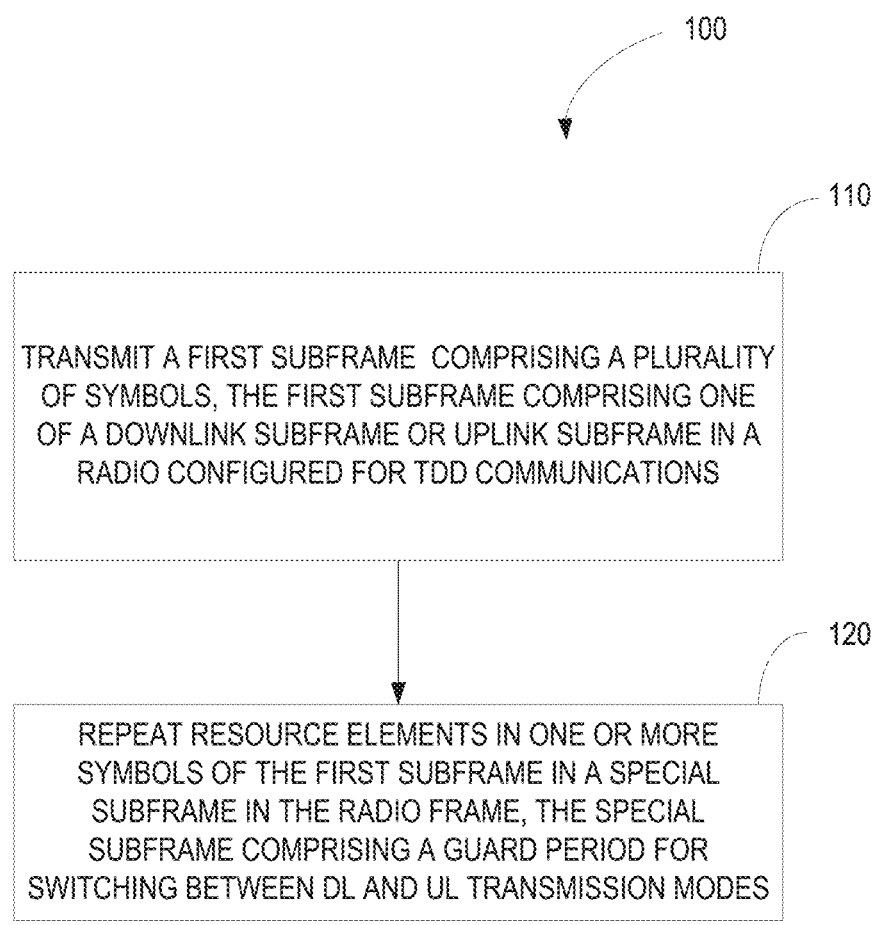
FIG. 9 illustrates an exemplary method of data transmission implemented by a radio node in a TDD communication network.

FIG. 9 illustrates an exemplary method 100 of data transmission implemented by a radio node (e.g., base station 20 or UE 30). The radio node 20, 30 transmits data in a first subframe comprising a plurality of symbols (block 110). The first subframe comprises one of a downlink subframe and an uplink subframe in a radio frame used for TDD communications. In other words, the first subframe can be either a regular downlink subframe or a regular uplink subframe. The radio node 20, 30 repeats resource elements in one or more symbols of the first subframe in a special subframe (block 120). In some embodiments, a repetition of resource elements in a symbol in the special subframe may contain less than all of the resources elements of the corresponding symbol in the first subframe. Resource elements not repeated can be replaced by reference signals in the special subframe.

Figure 10:
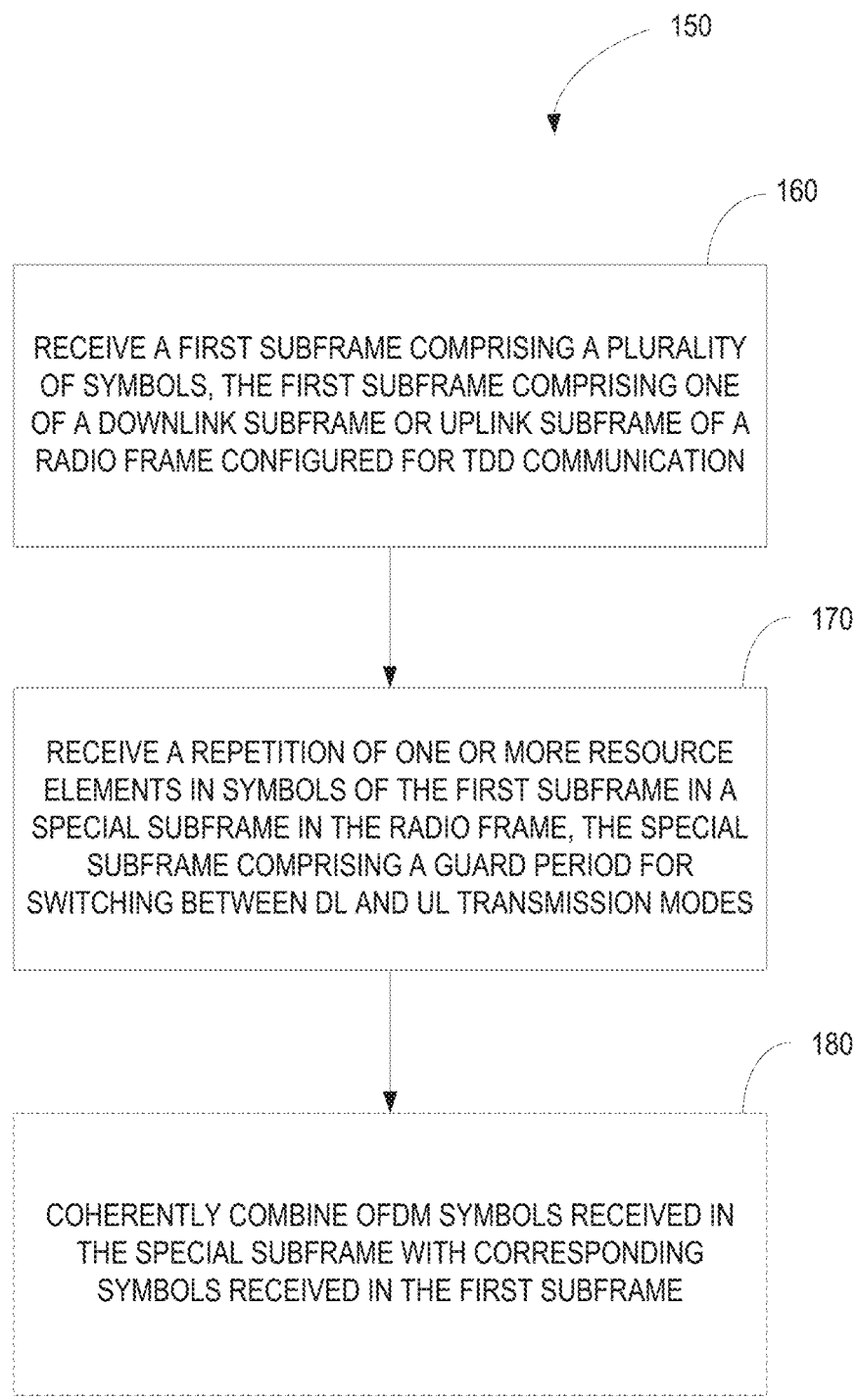
FIG. 10 illustrates an exemplary method of data reception implemented by a radio node in a TDD communication network.

FIG. 10 illustrates an exemplary method 150 of receiving data implemented by a radio node (e.g., base station 20 or UE 30). The radio node 20, 30 receives data in a first subframe comprising a plurality of symbols (block 160). The first subframe comprises one of a downlink subframe and an uplink subframe in a radio frame used for TDD communications. The radio node receives a special subframe preceding or succeeding the first subframe (block 170). The special subframe contains a repetition of resource elements in one or more symbols of the first subframe. The radio node may then optionally combine the symbols received in the special subframe with corresponding symbols received in the first subframe (block 180). In some embodiments, a repetition of a symbol in the special subframe may contain less than all of the resources elements of the corresponding symbol in the first subframe. Resource elements not repeated can be replaced by reference signals in the special subframe.

Figure 11:
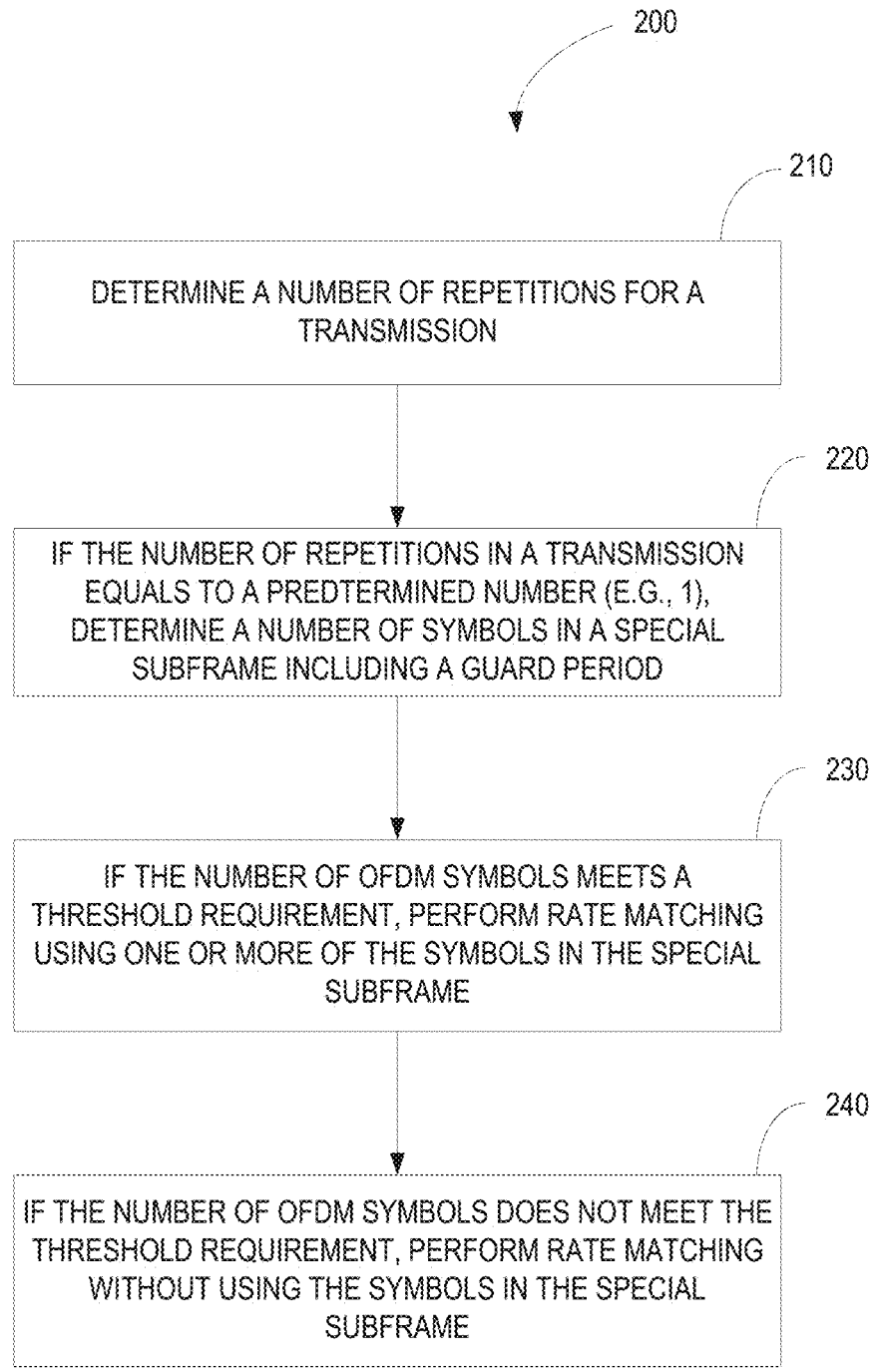
FIG. 11 illustrates an exemplary method of data reception implemented by a radio node in a TDD communication network.

FIG. 11 illustrates an exemplary method 200 implemented by a radio node (e.g., base station 20 or UE 30) configured to use the special subframes for rate matching. The radio node 20 or 30 determines a number of repetitions for a transmission (block 210). If the number of repetitions equals to a predetermined number (e.g., # of repetitions=1), the radio node 20 or 30 determines a number of symbols in a special subframe (block 220). In the case of a base station 20, the base station 20 determines the number of OFDM symbols in the DwPTS of the special subframe. In the case of a UE 30, the UE 30 determines the number of SC-FDMA symbols in the UpPTS of the special subframe. The determined number may include or exclude reserved symbols in the DwPTS or UpPTS. If the number of OFDM or SC-FDMA symbols in the DwPTS or UpPTS respectively of the special subframe meets a threshold requirement, the radio node 20, 30 uses available symbols in the special subframe to perform rate matching (block 230). If the number of symbols in the DwPTS or UpPTS respectively of the special subframe does not meet the threshold requirement, the radio node 20, 30 does not use the symbols of the special subframe for rate matching (block 240). In some embodiments, the special subframe may be counted as part of a resource unit comprising two or more subframes. The special subframe may be counted as part of a resource unit even though the number of available symbols is less than the threshold and the symbols are not used for rate matching.

Figure 12:
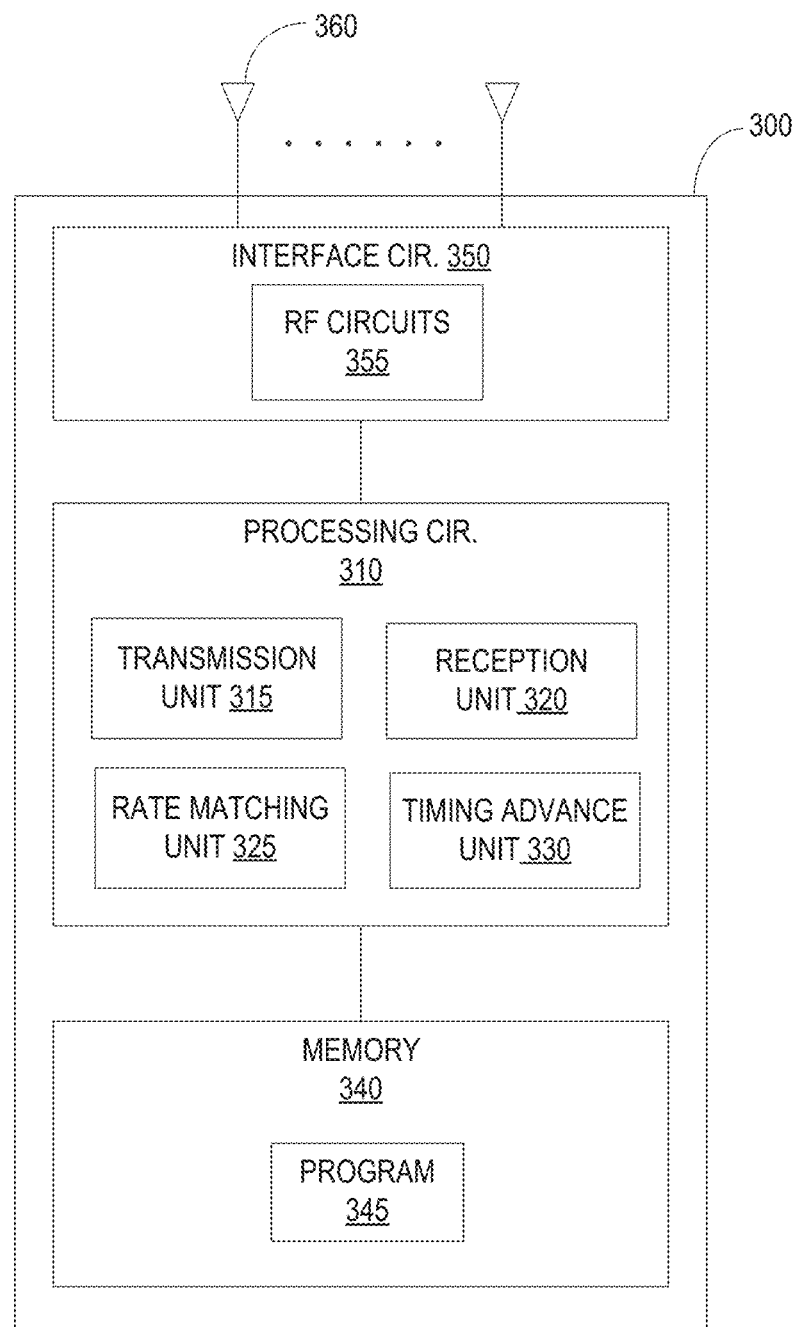
FIG. 12 illustrates the main functional elements of a radio node configured for TDD communications as herein described.

FIG. 12 illustrates the main functional components of radio node 300 (e.g., base station 20 or UE 30) configured for TDD communications as described herein. The radio node 300 comprises a processing circuit 310, a memory 340, and an interface circuit 350.

The interface circuit 350 includes a RF circuit 355 coupled to one or more antennas 360. The RF circuit 355 comprises the RF components needed for communicating with one or more UEs over a wireless communication channel. Typically, the RF components include a transmitter and receiver adapted for communications according to the LTE standards, or other RAT.

The processing circuit 310 processes the signals transmitted to or received by the radio node 300. Such processing includes coding and modulation of transmitted signals, and the demodulation and decoding of received signals. The processing circuit 310 can comprise one or more microprocessors, hardware, firmware, or a combination thereof. The processing circuit 310 is configured to perform the methods and procedures as herein described, including the methods of FIGS. 9 and 10.

In the exemplary embodiment shown in FIG. 12, the processing circuit 310 includes a transmission unit 315, a reception unit 320, a rate matching unit 325, and a timing advance unit 330. The transmission unit 315 and reception unit 320 are configured to perform TDD transmission and reception according to the methods 100 and 200 shown in FIGS. 9 and 10. The rate matching unit 325 is configured to perform rate matching as described above, including the method of FIG. 11. The timing advance unit is configured to adjust the transmit and receive timing as described above.

Memory 340 comprises both volatile and non-volatile memory for storing computer program code and data needed by the processing circuit 310 for operation. Memory 340 can comprise any tangible, non-transitory computer-readable storage medium for storing data including electronic, magnetic, optical, electromagnetic, or semiconductor data storage. Memory 340 stores a computer program 345 comprising executable instructions that configure the processing circuit 310 to implement the methods and procedures described herein, including the methods shown in FIGS. 8 and 9. In general, computer program instructions and configuration information are stored in a non-volatile memory, such as a ROM, EPROM or flash memory. Temporary data generated during operation can be stored in a volatile memory, such as a RAM. In some embodiments, the computer program 345 for configuring the processing circuit 310 can be stored in a removable memory, such as a portable compact disc, portable digital video disc, or other removable media. The computer program 345 can also be embodied in a carrier such as an electronic signal, optical signal, radio signal, or computer readable storage medium.

What is claimed is:
1. A method in a user equipment of transmitting data in a radio frame configured for Time Division Duplex, TDD, communication, wherein the radio frame comprises a special subframe, wherein the special subframe comprises an uplink part, said method comprising:

in case of a data transmission without repetition, determining a number of symbols in the uplink part of the special subframe;

when the number of symbols in the uplink part of the special subframe is greater than a threshold, counting the uplink part of the special subframe as part of a resource unit containing at least one normal uplink subframe and performing rate matching for the resource unit.

2. The method of claim 1, further comprising:

performing rate matching using the same code rate as for a resource unit without the special subframe and adjusting the Transmit Block Size, TBS, in the resource unit that contains the uplink part of special subframe to fill the one or more symbols.

3. The method of claim 1, further comprising:

performing rate matching by using the same Transport Block Size, TBS, as for a resource unit without a special subframe and adjusting the code rate in the resource unit that contains the uplink part of the special subframe to fill the one or more symbols.

4. A method in a base station of transmitting data in a radio frame configured for Time Division Duplex, TDD, communication, wherein the radio frame comprises a special subframe, wherein the special subframe comprises a downlink part, said method comprising:

in case of a data transmission without repetition, determining a number of symbols in the downlink part of the special subframe;

when the number of symbols in the downlink part of the special subframe is greater than a threshold, counting the downlink part of the special subframe as part of a resource unit containing at least one normal downlink subframe and performing rate matching for the resource unit.

5. The method of claim 4, further comprising:

performing rate matching using the same code rate as for a resource unit without the special subframe and adjusting the Transmit Block Size, TBS, in the resource unit that contains the downlink part of the special subframe to fill the one or more symbols.

6. The method of claim 4, further comprising:

performing rate matching by using the same Transport Block Size, TBS, as for a resource unit without a special subframe and adjusting the code rate in the resource unit that contains the downlink part of the special subframe to fill the one or more symbols.

7. A user equipment for transmitting data in a radio frame configured for Time Division Duplex, TDD, communication, wherein the radio frame comprises a special subframe, wherein the special subframe comprises an uplink part, the user equipment comprising:

interface circuitry for communicating with a base station in a wireless communication network; and processing circuitry operatively connected to the interface circuitry and configured to:

in case of a data transmission without repetition, determine a number of symbols in the uplink part of the special subframe;

if the number of symbols in the uplink part of the special subframe is greater than a threshold, counting the uplink part of the special subframe as part of a resource unit containing at least one normal uplink subframe and performing rate matching for the resource unit.

8. A base station configured for transmitting data in a radio frame for Time Division Duplex, TDD, communication, wherein the radio frame comprises a special subframe, and wherein the special subframe comprises a downlink part, the base station is adapted to:

interface circuitry for communicating with a user equipment in a wireless communication network; and processing circuitry operatively connected to the interface circuitry and configured to:

in case of a data transmission without repetition, determine a number of symbols in the downlink part of the special subframe;

if the number of symbols in the downlink part of the special subframe is greater than a threshold, count the downlink part of the special subframe as part of a resource unit containing at least one normal downlink subframe and perform rate matching for the resource unit.

9. A non-transitory computer-readable storage medium containing a computer program comprising executable instructions that, when executed by a user equipment in a wireless communication network for transmitting data in a radio frame for Time Division Duplex (TDD) communication, wherein the radio frame comprises a special subframe, and wherein the special subframe comprises a uplink part, causes the user equipment to:

in case of a data transmission without repetition, determine a number of symbols in the uplink part of the special subframe;

if the number of symbols in the uplink part of the special subframe is greater than a threshold, count the uplink part of the special subframe as part of a resource unit containing at least one normal uplink subframe and perform rate matching for the resource unit.

10. A non-transitory computer-readable storage medium containing a computer program comprising executable instructions that, when executed by a base station in a wireless communication network for transmitting data in a radio frame for Time Division Duplex (TDD) communication, wherein the radio frame comprises a special subframe, and wherein the special subframe comprises a downlink part, causes the base station to:

in case of a data transmission without repetition, determine a number of symbols in the downlink part of the special subframe;

if the number of symbols in the downlink part of the special subframe is greater than a threshold, count the downlink part of the special subframe as part of a resource unit containing at least one normal downlink subframe and perform rate matching for the resource unit.

* * * * *